United States Patent
Leclercq et al.

(10) Patent No.: US 12,385,544 B2
(45) Date of Patent: Aug. 12, 2025

(54) DIAPHRAGM HOLDER FOR AN OLEO-PNEUMATIC-TYPE SHOCK ABSORBER

(71) Applicant: SAFRAN LANDING SYSTEMS, Velizy Villacoublay (FR)

(72) Inventors: Sylvain Leclercq, Moissy-Cramayel (FR); Franck Lecuyer, Moissy-Cramayel (FR); Mathieu Joubert, Moissy-Cramayel (FR); Quentin Roirand, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 512 days.

(21) Appl. No.: 17/772,776

(22) PCT Filed: Oct. 27, 2020

(86) PCT No.: PCT/EP2020/080204
§ 371 (c)(1),
(2) Date: Apr. 28, 2022

(87) PCT Pub. No.: WO2021/083911
PCT Pub. Date: May 6, 2021

(65) Prior Publication Data
US 2022/0364626 A1    Nov. 17, 2022

(30) Foreign Application Priority Data
Oct. 29, 2019 (FR) ...................................... 1912126

(51) Int. Cl.
*F16F 9/00* (2006.01)
*B64C 25/60* (2006.01)
(Continued)

(52) U.S. Cl.
CPC ............ *F16F 9/3207* (2013.01); *B64C 25/60* (2013.01); *F16F 9/063* (2013.01);
(Continued)

(58) Field of Classification Search
CPC ........ F16F 9/3235; F16F 9/3242; F16F 9/342; F16F 9/3221; F16F 9/325; F16F 9/3207;
(Continued)

(56) References Cited

U.S. PATENT DOCUMENTS

| 10,612,568 B2 * | 4/2020 | Giannakopoulos .......................... F15B 15/1447 |
| 2004/0031351 A1 * | 2/2004 | Wirtz ......................... F16J 1/12 74/579 R |

(Continued)

FOREIGN PATENT DOCUMENTS

| DE | 112017004737 T5 | 6/2019 |
| FR | 2999528 A1 | 6/2014 |
| JP | 57-033239 A | 2/1982 |

OTHER PUBLICATIONS

International Search Report of PCT/EP2020/080204 dated Nov. 16, 2020 [PCT/ISA/210].

(Continued)

*Primary Examiner* — Nicholas J Lane
(74) *Attorney, Agent, or Firm* — Sughrue Mion, PLLC

(57) ABSTRACT

A diaphragm holder for an oleo-pneumatic-type shock absorber includes a tubular body made of thermoplastic material, having one end arranged to hold a diaphragm and an opposite end defining an arched bottom for withstanding pressure forces. An insert is housed in the bottom of the tubular body and is arranged to mechanically reinforce the bottom and to distribute the pressure forces evenly.

9 Claims, 4 Drawing Sheets

(51) Int. Cl.
*F16F 9/32* (2006.01)
*F16F 9/06* (2006.01)

(52) U.S. Cl.
CPC . *F16F 2226/045* (2013.01); *F16F 2230/0041* (2013.01); *F16F 2230/02* (2013.01); *F16F 2230/36* (2013.01); *F16F 2234/02* (2013.01)

(58) Field of Classification Search
CPC ............... F16F 9/063; F16F 2226/045; F16F 2230/0041; F16F 2230/02; F16F 2230/36; F16F 2234/02; B64C 25/60
See application file for complete search history.

(56) References Cited

U.S. PATENT DOCUMENTS

| | | | |
|---|---|---|---|
| 2005/0211831 A1* | 9/2005 | Courtois | F16F 9/064 |
| | | | 244/102 R |
| 2005/0230887 A1* | 10/2005 | Martinez | B64C 25/60 |
| | | | 267/64.11 |
| 2007/0120300 A1 | 5/2007 | Achenbach | |
| 2022/0333663 A1* | 10/2022 | Rölleke | F16F 9/3242 |
| 2022/0403904 A1* | 12/2022 | Leclercq | F16F 9/3221 |

OTHER PUBLICATIONS

Written Opinion of PCT/EP2020/080204 dated Nov. 16, 2020 [PCT/ISA/237].

* cited by examiner

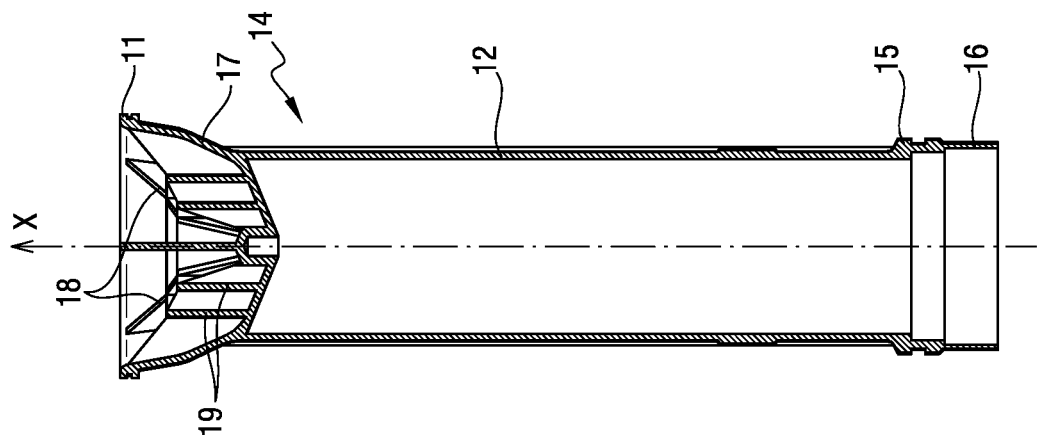
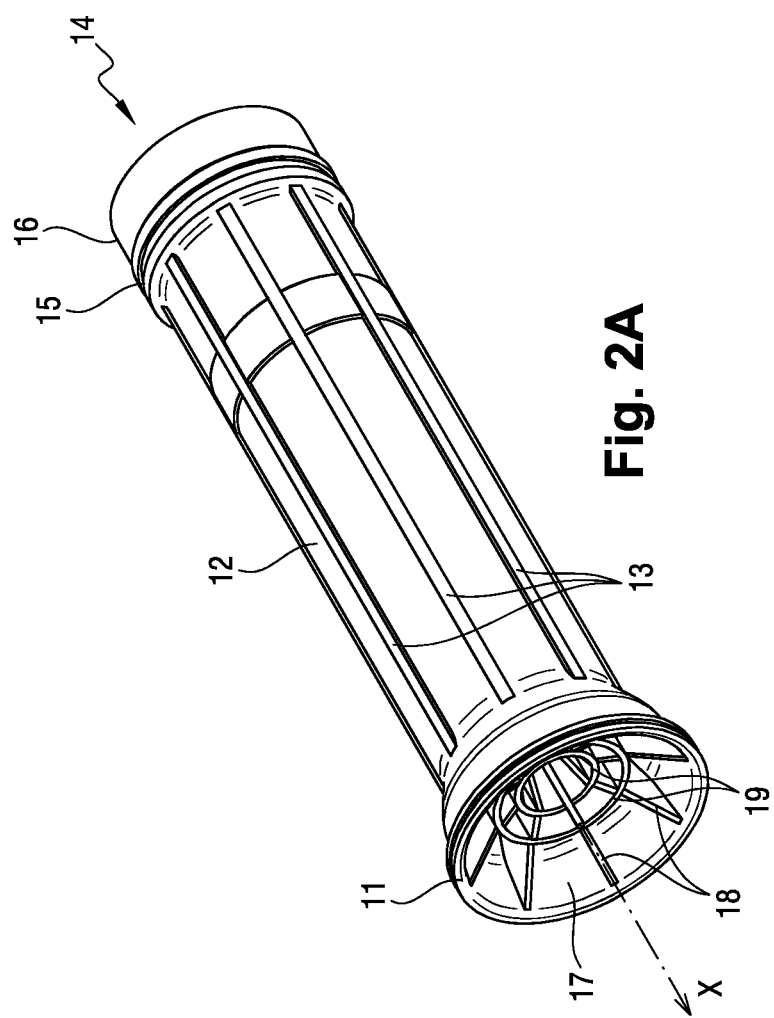
Fig. 2B
Fig. 2A

DIAPHRAGM HOLDER FOR AN OLEO-PNEUMATIC-TYPE SHOCK ABSORBER

CROSS REFERENCE TO RELATED APPLICATIONS

This application is a National Stage of International Application No. PCT/EP2020/080204 filed on Oct. 27, 2020, claiming priority based on French Patent Application No. 1912126 filed on Oct. 29, 2019, the entire contents of each of which being herein incorporated by reference in their entireties.

The present invention relates to the field of hydraulic shock absorbers and more specifically, a diaphragm holder for an oleo-pneumatic-type shock absorber equipping in particular, although not exclusively, aircraft landers.

BACKGROUND OF THE INVENTION

An aircraft lander generally comprises an oleo-pneumatic-type shock absorber which makes it possible to ensure the stabilisation and the control of the movements of the aircraft, in particular during taxiing and landing phases. The oleo-pneumatic-type shock absorber comprises a box in which a rod is mounted to slide. The box and the rod together define an internal volume separated into two chambers by a diaphragm integral with said box. One of the chambers is filled with a hydraulic fluid, while the other chamber is filled with the same hydraulic fluid and a pressurised gas. The diaphragm comprises calibrated orifices through which the hydraulic fluid can pass by undergoing a hydraulic resistance.

The diaphragm is traditionally held by a diaphragm holder tube which is sized to not burn under compression force peaks that the shock absorber undergoes during the landing phases of the aircraft.

Thus, the diaphragm holder tubes are generally made of metal. However, the manufacture of such diaphragm holder tubes involves expensive and long machining operations. What is more, the manufacture by machining involves minimum wall thicknesses which prevent reducing the mass of the metal diaphragm holder tubes, while they are oversized for the forces that they must undergo.

From document FR-A-2 999 528, diaphragm holder tubes made of thermoplastic material are known, allowing to decrease the mass and the manufacturing time of the diaphragm holder tubes, while meeting the mechanical performances necessary for the correct operation of the shock absorber.

However, if injection manufacturing makes it possible to optimise the shapes of the diaphragm holder tubes, in particular to decrease their mass, it can also limit the improvement of their mechanical performances. Indeed, a plastic material diaphragm holder tube, of which the structure would be optimised to improve its performances, would comprise confined zones that it would be difficult, even impossible, to achieve by injection.

AIM OF THE INVENTION

The invention therefore aims to propose a diaphragm holder allowing to at least partially prevent the abovementioned disadvantages.

SUMMARY OF THE INVENTION

To this end, a diaphragm holder for an oleo-pneumatic-type shock absorber is proposed which comprises a tubular body made of thermoplastic material. The tubular body has an end arranged to hold a diaphragm provided with flow restriction orifices and an opposite end defining a arched bottom to hold pressure forces.

According to the invention, an insert is housed in the bottom of the tubular body and is arranged to mechanically reinforce said bottom and distribute the pressure forces evenly.

The arrangement of such an insert allows to repel the mechanical performances of a diaphragm holder made totally of thermplastic material.

Particularly, the insert is made of metal, preferably steel or aluminium, or made of composite material.

According to a preferred embodiment of the invention, the insert is a cylindrical bush press-fitted on an injection gate of the tubular body. The injection gate subsequently forms a pin for centring the sleeve in the bottom of the tubular body.

According to a particular characteristic of the invention, an outer surface of the sleeve engages with an inner surface of a cylindrical stiffener of the bottom of the tubular body, which allows to distribute the pressure forces evenly.

The invention also relates to an oleo-pneumatic-type shock absorber comprising a diaphragm provided with flow restriction orifices and separating an inner volume of the shock absorber into two chambers, the diaphragm being held by such a diaphragm holder.

The invention also relates to an aircraft lander comprising such a shock absorber.

The invention further relates to an aircraft comprising such a lander.

BRIEF DESCRIPTION OF THE DRAWINGS

The invention will be best understood in the light of the following description, which is purely illustrative and non-limiting, and must be read regarding the appended drawings, among which:

FIG. 2A is a perspective view of a diaphragm holder known per se;

FIG. 2B is an axial cross-sectional view of the diaphragm holder illustrated in FIG. 2A;

DETAILED DESCRIPTION OF THE INVENTION

Figure 1:
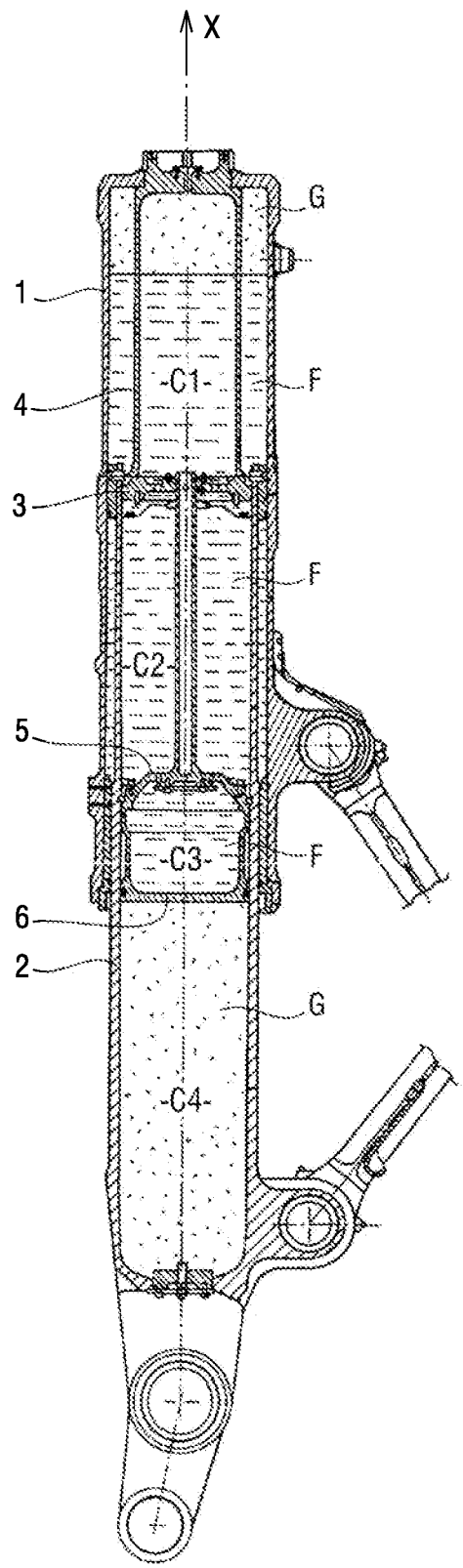
FIG. 1 is a schematic cross-sectional view of an aircraft lander comprising a shock absorber known per se.

FIG. 1 represents an aircraft lander comprising an oleo-pneumatic-type shock absorber. In a manner known per se, the lander comprises a box 1 in which a rod 2 is mounted to slide along a vertical axis X. A lower end of the rod 2 is arranged to receive an axle or a bogie holding one or more wheels.

A diaphragm 3 separates the inside of the box 1 into a first chamber C1 filled with a hydraulic fluid F and a pressurised gas G and a second chamber C2 filled with hydraulic fluid F. The diaphragm 3 is held by a lower end of a diaphragm holder 4 extending along the axis X, while an upper end of the diaphragm holder 4 is directly added on a ceiling of the box 1.

The second chamber C2 is moreover delimited by a bottom 5 added in the rod 2. Under the bottom 5 extends a third chamber C3 filled with hydraulic fluid F and a fourth chamber C4 filled with pressurised gas G. The third chamber C3 and the fourth chamber C4 are separated by a separating piston 6.

The diaphragm 3 and the bottom 5 are provided with calibrated orifices allowing the hydraulic fluid F to as respectively from the second chamber C2 to the first chamber C1 and from the second chamber C2 to the third chamber C3. All this is well-known, and is only reminded of as an illustration.

FIGS. 2A and 2B illustrate a diaphragm holder 14 made of thermoplastic material well-known from the prior art. The diaphragm holder 14 is similar to that presented in FIG. 1, except its upper end comprises a cylindrical seat 11 arranged to be able to be adjusted in a homologous cylindrical seat arranged in the box 1, and bear against a step of said box 1. The cylindrical seat 11 comprises a groove arranged to receive a seal (not represented).

Moreover, the diaphragm holder 14 comprises a substantially tubular running part 12 comprising here longitudinal stiffeners 13 which run along the running part 12 parallel to the axis X and radially projecting outwards. The stiffeners 13 are regularly distributed around the running part 12.

The lower end of the diaphragm holder 14 comprises a cylindrical seat 15 adapted to slide in the rod 2 and an end part 16 on which the diaphragm 3 is added. Similarly to the cylindrical seat 11, the cylindrical seat 15 comprises a groove arranged to receive a sliding block (not represented).

The upper end of the diaphragm holder 14 has a bottom forming an arch 17, axisymmetrical with convexity oriented towards the diaphragm 3, which is integral with the running part 12. The arch 17 is consolidated inside by a dual stiffening system comprising, on the one hand, a pair of rings 19 centred on the axis X (namely an inner ring and an intermediate ring between the inner ring and the arch 17) and, on the other hand, a network of radial ridges 18 converging towards the central axis X of the diaphragm holder 14 by extending from the arch 17 to the most inner of the rings 19. In this way, the arch 17 is stabilised and can resist significant pressure forces, while having an optimal arrangement of material contributing to a lightening in mass of the diaphragm holder 14.

Figure 3A:
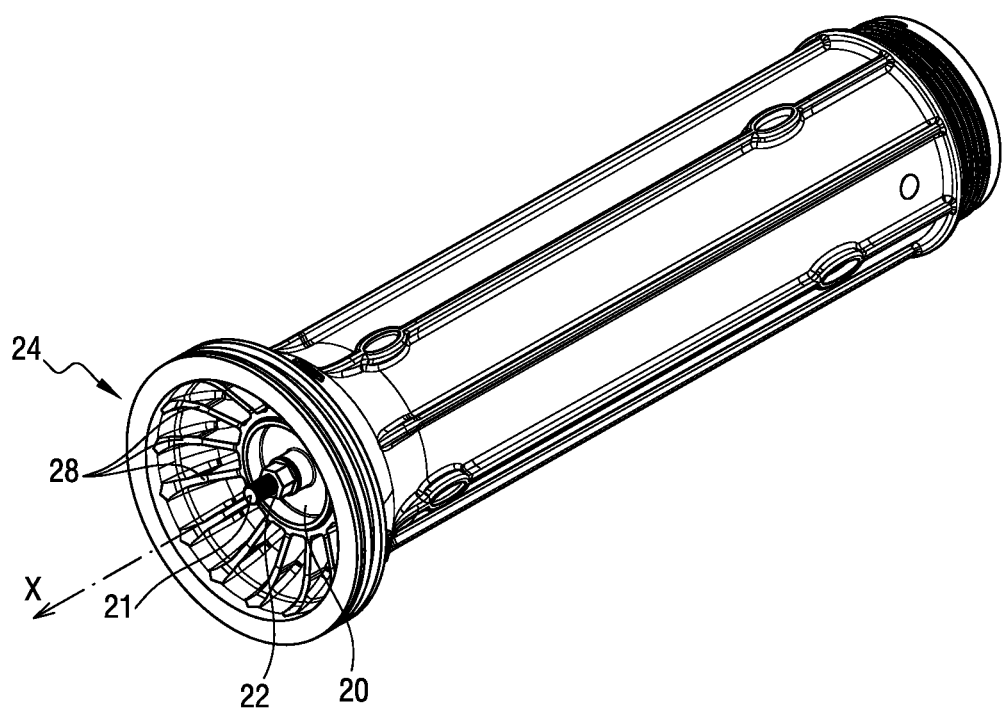
FIG. 3A is a perspective view of a diaphragm holder according to a particular embodiment of the invention.
Figures 3B, 3C:
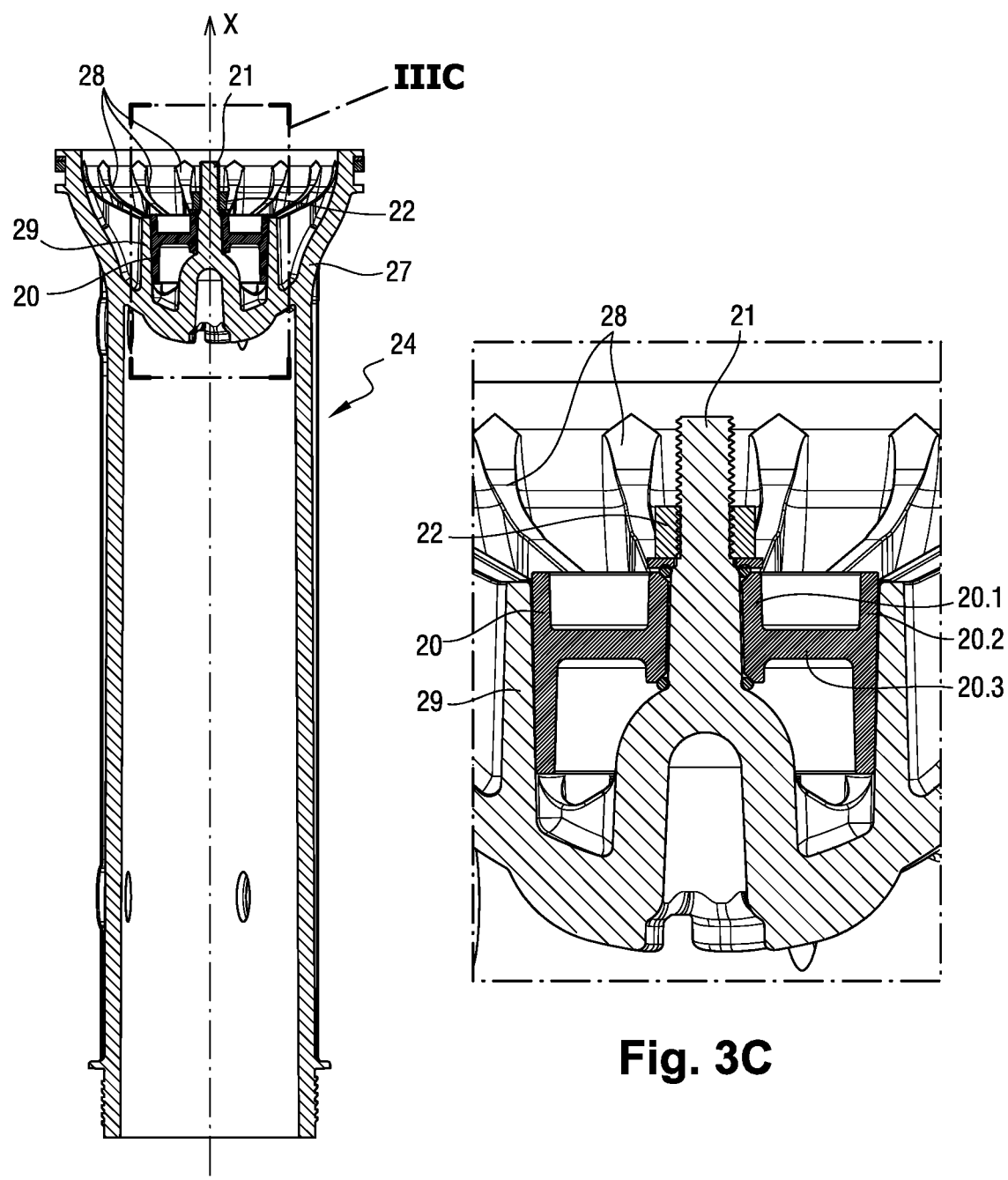
FIG. 3B is an axial cross-sectional view of the diaphragm holder illustrated in FIG. 3A.
FIG. 3C is a detailed view of an end of the diaphragm holder illustrated in FIG. 3B.

FIGS. 3A, 3B and 3C illustrate a diaphragm holder 24 according to a particular embodiment of the invention. The diaphragm holder 24 differs from the diaphragm holder 14 in that the arch stiffening system only comprises one single intermediate ring 29 extending along the central axis X of the diaphragm holder 24 and from which extends a network of radial ridges 28 in the direction of the arch 27. The intermediate ring 29 comprises an inner surface and an outer surface which are substantially truncated, allowing to facilitate the demoulding of the diaphragm holder 24.

The arch stiffening system 27 moreover comprises a sleeve 20 housed inside an inner volume delimited by the intermediate ring 29. The sleeve 20 comprises an inner tube 20.1 and an outer tube 20.2 which are coaxial to one another and which are connected together by a wall 20.3 extending transversally to the axis X. An outer surface of the outer tube 20.2 of the sleeve 20 is shaped to engage with the substantially truncated inner surface of the intermediate ring 29, while an inner surface of the inner tube 20.1 of the sleeve 20 is shaped to engage with a substantially truncated outer surface of an injection gate 21 of the diaphragm holder 24. The injection gate 21 extends along the axis X and forms a centring pin on which the sleeve 20 is press-fitted. The sleeve 20 is fixed on the injection gate 21 via a nut 22 screwed on the free end of said injection gate 21 to bear on an end of the inner tube 20.1 of the sleeve 20.

The sleeve 20 is here made of metal, preferably steel or aluminium.

The sleeve 20 forms an insert added into the arch 27 of the diaphragm holder 24 and allows a better distribution and transfer of forces exerted by the hydraulic fluid F and the gas G on the upper end of the diaphragm holder 24, in particular during the compression of the shock absorber. The sleeve 20 thus allows to improve the technical performances of the diaphragm holder 14 made totally of thermoplastic material.

Of course, the invention is not limited to the embodiments described, but comprises any variant entering into the field of the invention such as defined by the claims.

Although the sleeve is here made of metal, it can be made of any other material having a mechanical resistance greater than that of the thermoplastic material constituting the diaphragm holder. In particular, the sleeve can be made of any material guaranteeing isotropic characteristics to the sleeve, allowing an axisymmetrical deformation of the diaphragm holder during the compression of the shock absorber. The sleeve can, for example, be made of composite material.

The geometry and the dimensions of the sleeve can be different from those illustrated. The insert can, for example, pass through the arch.

Although the presence of the gate is particularly advantageous for facilitating the positioning of the insert, it is possible to remove the gate before placing the insert in the arch.

The insert can be fixed by any means in the arch, whether through press fitting, gluing, screwing, clipping, etc.

Although the diaphragm 3 separates here the inner volume of the shock absorber into two chambers C1 and C2, it can also delimit one single chamber and have no flow orifices.

The invention claimed is:

1. A diaphragm holder for an oleo-pneumatic-type shock absorber, the diaphragm holder comprising:
   a tubular body made of thermoplastic material having a first end arranged to hold a diaphragm and a second end, opposite the first end, defining an arched bottom to hold pressure forces, and
   an insert housed in a volume defined by the arched bottom of the tubular body to mechanically reinforce said arched bottom and to distribute the pressure forces evenly,
   wherein the insert is a cylindrical sleeve press-fitted on an injection gate of the tubular body.

2. The diaphragm holder according to claim 1, wherein the insert is made of metal or composite.

3. The diaphragm holder according to claim 1, wherein an outer surface of the sleeve engages with an inner surface of a cylindrical stiffener of the arched bottom of the tubular body.

4. The diaphragm holder according to claim 3, wherein a network of radial ridges extends from the cylindrical stiffener in the direction of the arched bottom of the tubular body.

5. An oleo-pneumatic-type shock absorber comprising a diaphragm held by the diaphragm holder according to claim 1.

6. The oleo-pneumatic-type shock absorber according to claim 5, wherein the diaphragm is provided with flow restriction orifices and separates an inner volume of the shock absorber into two chambers.

7. An aircraft lander comprising the oleo-pneumatic-type shock absorber according to claim 5.

8. An aircraft comprising the aircraft lander according to claim 7.

9. The diaphragm holder according to claim 2, wherein the insert is made of metal, and the metal comprises steel or aluminium.

\* \* \* \* \*